(12) United States Patent
Keene (10) Patent No.: US 9,743,644 B1
(45) Date of Patent: Aug. 29, 2017

(54) PET TOY

(71) Applicant: Carolyn D. Keene, Boca Raton, FL (US)

(72) Inventor: Carolyn D. Keene, Boca Raton, FL (US)

(73) Assignee: SHEER FUN FOR CATS LLC, Boca Raton, FL (US)

( * ) Notice: Subject to any disclaimer, the term of this patent is extended or adjusted under 35 U.S.C. 154(b) by 0 days.

(21) Appl. No.: 14/497,867

(22) Filed: Sep. 26, 2014

Related U.S. Application Data (60) Provisional application No. 61/884,290, filed on Sep. 30, 2013.

(51) Int. Cl.
*A01K 15/02* (2006.01)

(52) U.S. Cl.
CPC .................. *A01K 15/025* (2013.01)

(58) Field of Classification Search
CPC ..... A01K 15/025; A01K 15/024; A01K 15/02
USPC ........................................................ 119/711
See application file for complete search history.

(56) References Cited

U.S. PATENT DOCUMENTS

| | | | | |
|---|---|---|---|---|
| 4,133,296 A | * | 1/1979 | Smith | A01K 15/026 119/709 |
| 4,841,587 A | * | 6/1989 | Carter | A45C 3/10 455/344 |
| 5,118,318 A | * | 6/1992 | Lorizio | A47G 9/0253 428/100 |
| 5,261,131 A | | 11/1993 | Kilby | |
| 5,474,026 A | * | 12/1995 | Wohltjen | A01K 15/024 119/28.5 |
| 6,952,845 B1 | * | 10/2005 | Akkad | A45F 4/02 383/4 |
| 8,307,476 B1 | * | 11/2012 | Weaver | A47G 9/062 5/417 |
| 8,763,181 B1 | * | 7/2014 | Penfold | A47G 23/0306 5/420 |
| 8,852,717 B2 | * | 10/2014 | Davis | A01K 1/0107 119/169 |
| 2003/0089749 A1 | * | 5/2003 | Valdez-Campbell | A45C 7/0095 224/153 |
| 2003/0159193 A1 | * | 8/2003 | LeFevre | A47G 9/0223 2/69.5 |

(Continued)

OTHER PUBLICATIONS

Bed Bath & Beyond Curtain Panel product information (Oldest review dated Jul. 27, 2011).*

(Continued)

*Primary Examiner* — Monica Williams
*Assistant Examiner* — Jessica Wong
(74) *Attorney, Agent, or Firm* — Lodestone Legal Group; Jeromye V. Sartain (57) ABSTRACT

A pet toy (100, 600) formed from a substantially rectangular sheer center cloth portion (100, 600) with at least one edge a hemmed cloth side formed along the at least one edge (120, 122, 140, 142, 620, 622, 640, 642). The material is light weight and breathable. One or more images (112) are disposed on the sheer center cloth portion (100, 600). The center portion and the hemmed portion are made from natural fiber, synthetic fiber, or a combination thereof. One or more straps 1260, 1262) may be coupled to the hemmed cloth side. A pocket may be formed in the at least one edge to hold catnip.

17 Claims, 10 Drawing Sheets

(56) References Cited

U.S. PATENT DOCUMENTS

| | | | | |
|---|---|---|---|---|
| 2006/0207956 | A1* | 9/2006 | Sivers | A47G 29/00 211/113 |
| 2007/0277280 | A1* | 12/2007 | Kelly | A41B 13/10 2/48 |
| 2008/0235870 | A1* | 10/2008 | Heide | A47G 9/04 5/484 |
| 2010/0199921 | A1* | 8/2010 | Haaf | A01K 5/0114 119/706 |
| 2011/0209261 | A1* | 9/2011 | Lyle | A41B 13/10 2/49.1 |
| 2012/0020586 | A1* | 1/2012 | Gilbert | A45C 9/00 383/4 |
| 2013/0062023 | A1* | 3/2013 | Little | E06B 9/303 160/109 |
| 2013/0239290 | A1* | 9/2013 | Rossi | A41D 7/008 2/84 |
| 2014/0013509 | A1* | 1/2014 | Gravett | A47G 9/0223 5/494 |

OTHER PUBLICATIONS

Supplemental Notice of Allowability dated Apr. 28, 2015 received for U.S. Appl. No. 29/475,563.

\* cited by examiner

PET TOY

CROSS REFERENCE TO RELATED APPLICATIONS

This application is based upon and claims priority to U.S. Provisional Patent Application Ser. No. 61/884,290, entitled "CAT TOY", filed on Sep. 30, 2013, the disclosure of which is hereby incorporated by reference in its entirety.

BACKGROUND

Field of the Invention

This invention relates generally to pet toys, and more specifically to cat toys.

Related Art

Cats are known to be quite agile and capable of playing for extended periods of time, especially if appropriate distractions and toys are provided for their amusement and enjoyment. Toys specifically designed to engage cats in playful activity are well known. Toys such as fake mice, feathers and balls have all been marketed and sold to cat lovers in order to give their cats items to play with in place of their natural hunting activity that occurs in the wild. However, cats are smart and figure out their toys and often get bored with them.

For the foregoing reasons, there is a need for a pet toy that is stimulating to the cats, and brings out the cat's instinct to hide, stalk, and pounce. The pet toy should be capable of being folded and easily transported and/or stored as desired, and unfolded into a substantial play area and have a plurality of toys, when deployed for use and entertainment.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Described as an interactive pet toy. The toy is known as "Hide and See Kitty" or "Sheer Fun For Cats". The toy includes a sheer center panel made from rectangular or square fabric or other geometric shape. The toy is hemmed with an edging to reduce fraying of the center sheer panel. The edging can be any color or include any design/pattern. The hemming can be sewn or glued or a combination of both. The same material as the sheer center panel may be used. A material for the edging that is different from the sheer center panel may be used. The sheer center panel can be sewn or glued or a combination of both to the edging. In one example, the toy can be draped on top of cat. In another example, the toy can be draped on furniture with a strap or attached to a wall or underneath a table using Velcro® type fasteners or suction cups. A space is left for the cat to get behind the toy. The toy gives the cat the illusion that they are hidden. The toy can include color picture on the sheer center panel. The picture may be black and white, gray scale or full color.

The inventor discovered a need for a pet toy that enhances play, makes playtime more interesting, challenging, and fun. Using the claimed invention, cats will entertain themselves with it for an extended period of time. Hiding is how cats begin their hunt and this toy provides a secluded place where a cat can hide and still see their prey and surroundings. The sheer toy can also be laid on top of other pet toys, for example mice and saucers, which make these toys more interesting.

Cats are smart and figure out their toys and get bored with them. When cats view their toys through this sheer panel, the toys become more interesting and the cat feels hidden. Cats love to feel hidden but yet they can still see their prey and toys. The toy is light so cats can safely play underneath it. Cats like to stalk their prey. A sheer panel provides similar camouflage to a cat as does tall grass in the outdoors. Like tall grass, the sheer panel enables a cat to surprise their prey. Cats are excited to hide behind and stalk their prey and then run through the sheer panel, as if they're running through tall grass, to capture their prey. Moreover, the toy takes up very little room, and is washable. Cats peek through and around corners of the toy but still feel they are hiding. The toy can be sold with an additional toy or two, for example, a small ball or mouse. These additional toys will assist with getting the fun started. Moreover, many of the cat's current, old, boring toys will become new and more interesting, when viewed from behind the sheer toy.

The specification and figures are to be regarded in an illustrative rather than a restrictive sense, and all such modifications are intended to be included within the scope of the present invention. Any benefits, advantages or solutions to problems described herein with regard to specific examples are not intended to be construed as a critical, required or essential feature or element of any or all the claims.

The Detailed Description section, and not the Abstract section, is intended to be used to interpret the claims. The Abstract section may set forth one or more but not all examples of the invention, and the Abstract section is not intended to limit the invention or the claims in any way.

Non-Limiting Terminology

The terms "a" or "an," as used herein, are defined as one or more than one.

The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

The term "coupled,", as used herein, is defined as "connected" although not necessarily directly.

The term "geometrically-shaped," as used herein, is defined as include circular, polygon, rectangular, square, and triangular shapes.

The term "fabric" is used to mean a cloth made from natural fiber, synthetic fiber, or combination of both.

Unless stated otherwise, terms such as "first" and "second" are used to arbitrarily distinguish between the elements such terms describe. Thus, these terms are not necessarily intended to indicate temporal or other prioritization of such elements.

The term "sheer" is used to denote a very fine or diaphanous fabric or cloth.

First Example of Pet Toy

Figure 1:
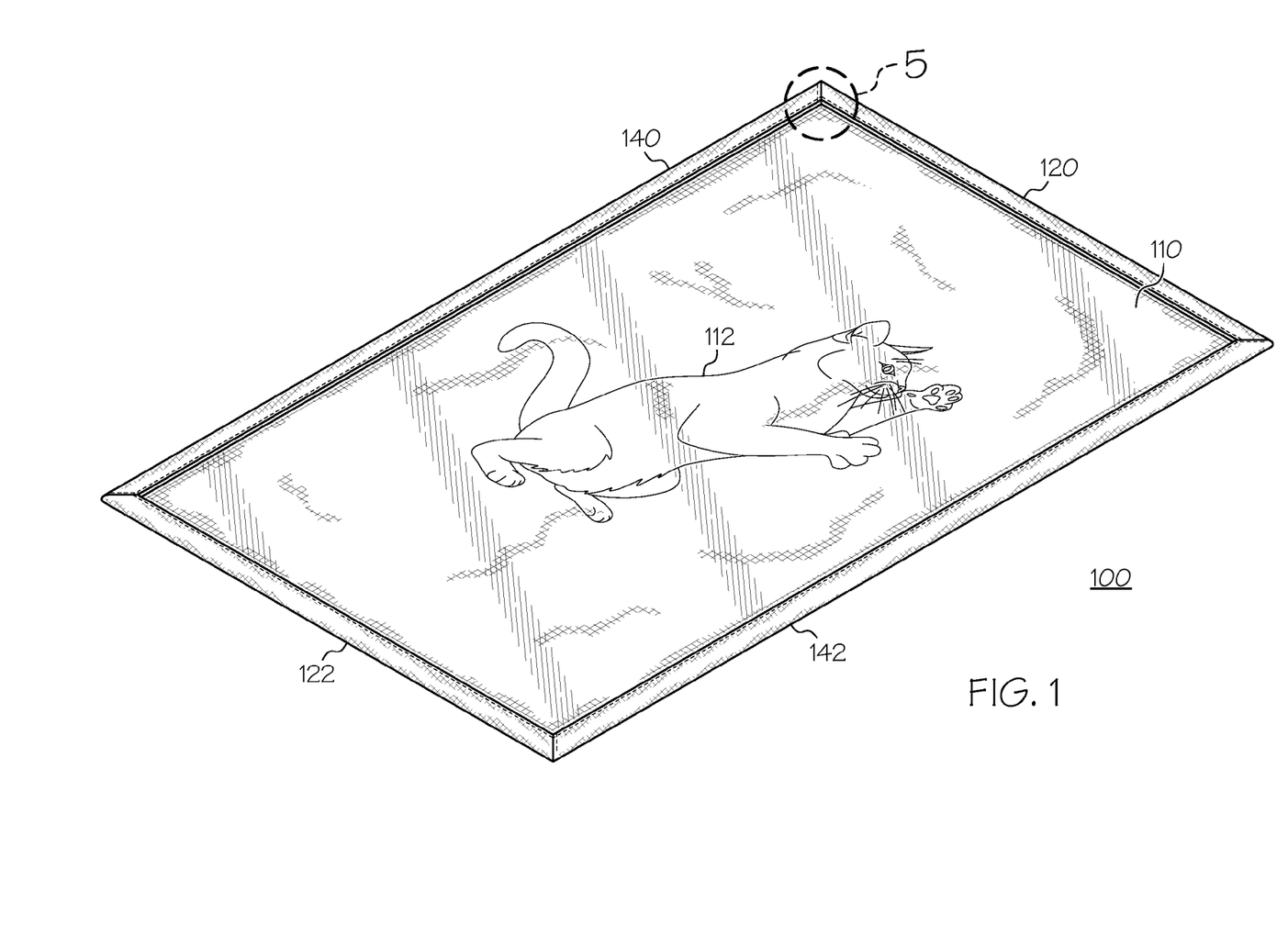
FIG. 1 is a perspective view of a pet toy with a sheer center cloth portion with an image in a first example.
Figure 2:
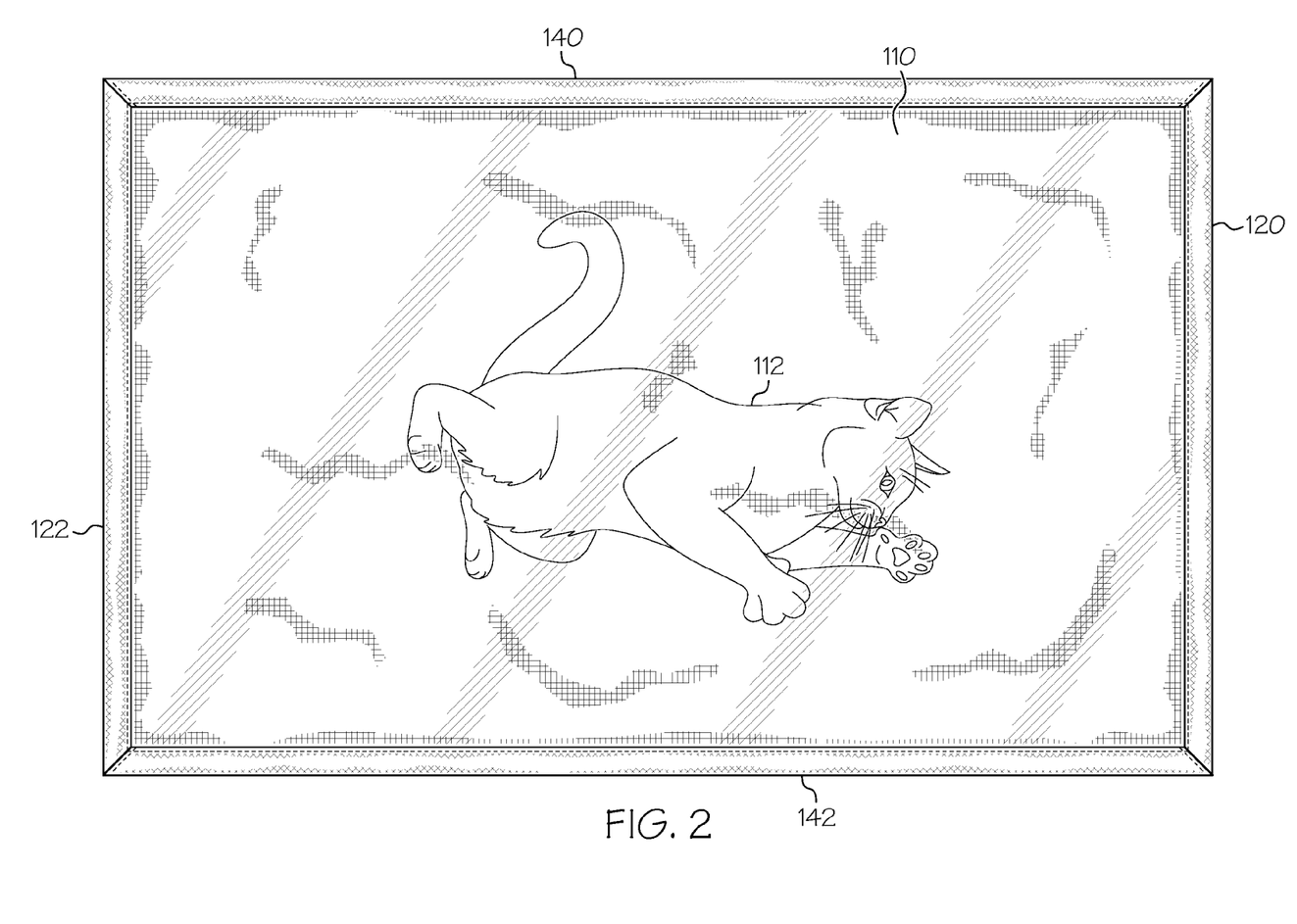
FIG. 2 is a front plan view of FIG. 1, where the back plan view is a mirror image.
Figure 3:
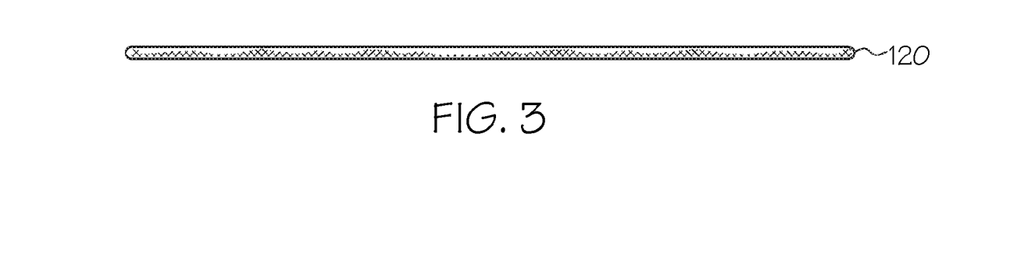
FIG. 3 is a left plan view of FIG. 1, where the right plan view is a mirror image.
Figure 4:
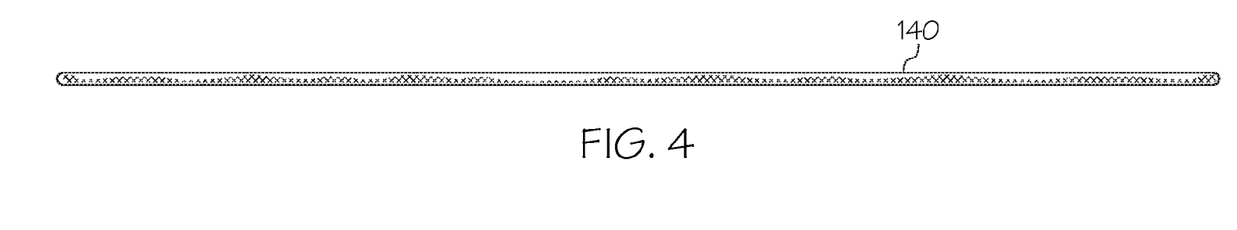
FIG. 4 is a top plan view of FIG. 1, where the bottom plan view is a mirror image.

Turning now to FIG. 1 and FIG. 2 shown is a first example of a pet toy 100 with a sheer center cloth portion 110 with an image 112. The image 112 can be any image, including a playful cat as shown. This image can be applied to the sheer center cloth portion 110 or woven the sheer center cloth portion 110 as a design. The pet toy is substantially rectangular in shape with four hemmed cloth sides shown 120, 122, 140, 142. The four sides 120, 122, 140, 142 in one example are made from the same material as the sheer center cloth portion 110. Also the four sides 120, 122, 140, 142 in another example are just hemmed portions of the sheer center cloth portion 110. In another example, the four sides are made from different materials. FIG. 3 is a left plan view of FIG. 2, where the right plan view is a mirror image. A top plan view of FIG. 2 is shown in FIG. 4, where the bottom plan view is a mirror image.

Figure 5:
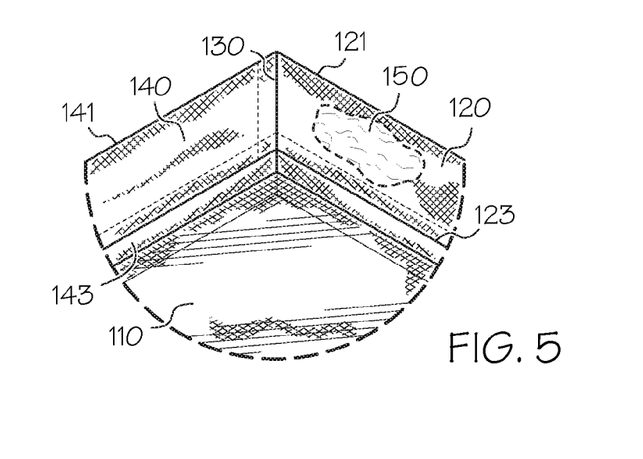
FIG. 5 is a detailed top plan view of a corner of FIG. 1.

FIG. 5 is a detailed top plan view of a corner of FIG. 1. A seam 130 where the two sides 120 and 140 are joined is shown. Other seams may be created at the other corners where the cloth sides 120, 122, 140, 142 are joined. Also shown is a seam 123 and 143 to join with the sheer center cloth portion 110 in the case where the cloth material for the cloth sides 120, 122, 140, 142 is different than the cloth material for the sheer center cloth portion 110.

Second Example of Pet Toy

Figure 6:
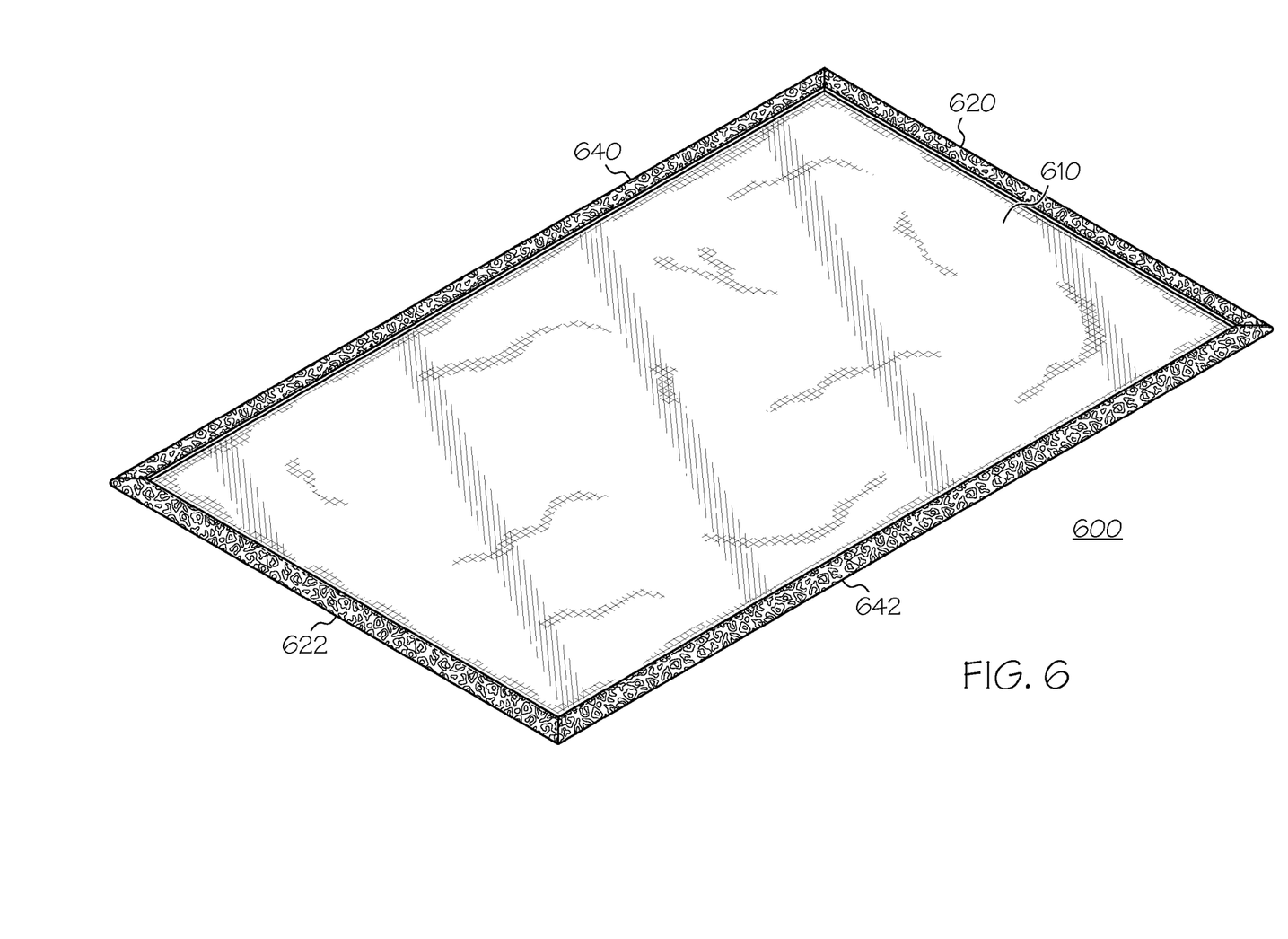
FIG. 6 is a perspective view of a pet toy with a sheer center cloth portion and decorative cloth edge in a second example.
Figure 7:
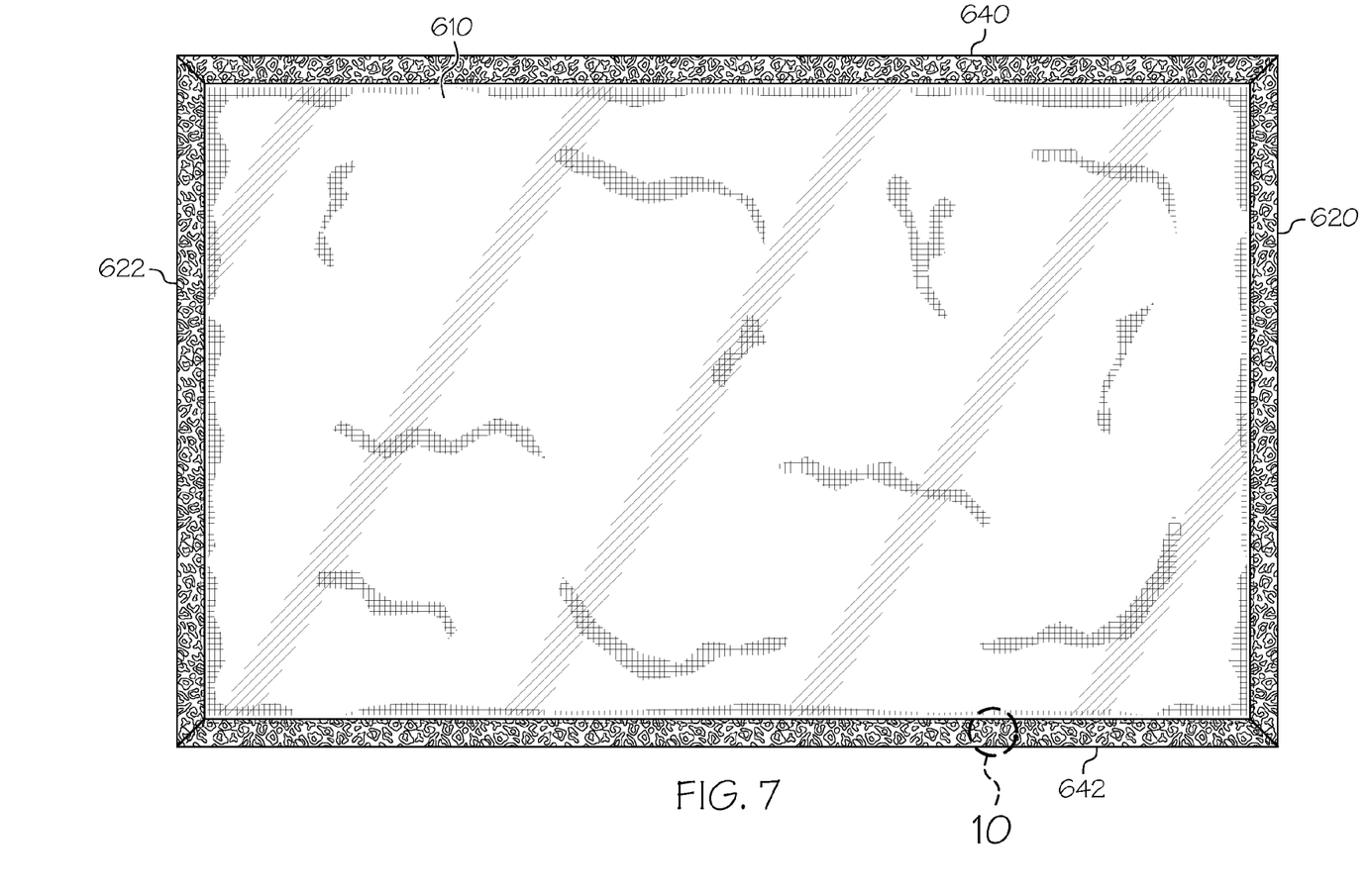
FIG. 7 is a front plan view of FIG. 6, where the back plan view is a mirror image.

Turning now to FIG. 6 and FIG. 7 shown is a second example of a pet toy 600 with a sheer center cloth portion 610 with four decorative cloth edges 620, 622, 640, 642. Although the sheer center portion and cloth edge are shown as substantially rectangular in shape, other geometric shapes are contemplated within the true scope and spirit of this invention.

Figure 8:
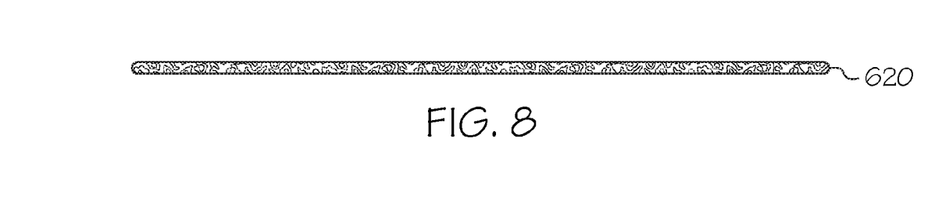
FIG. 8 is a left plan view of FIG. 6, where the right plan view is a mirror image.
Figure 9:
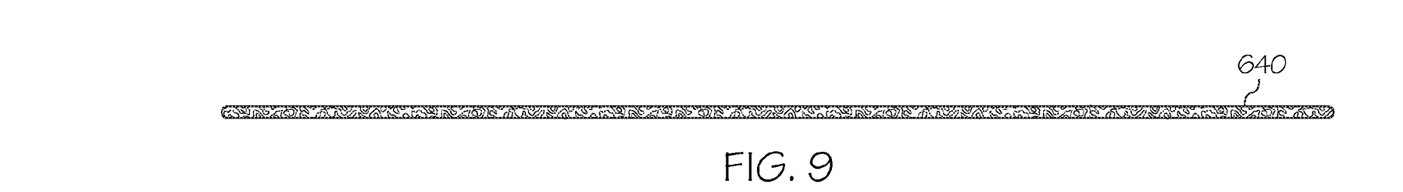
FIG. 9 is a top plan view of FIG. 6, where the bottom plan view is a mirror image.

The four hemmed cloth sides are shown 620, 622, 640, 642. The four cloth sides 620, 622, 640, 642 in one example are made from the same material as the sheer center cloth portion 610. In another example, the four cloth sides 620, 622, 640, 642 are made from different material. FIG. 8 is a left plan view of FIG. 7, where the right plan view is a mirror image. A top plan view of FIG. 7 is shown in FIG. 9, where the bottom plan view is a mirror image.

Figure 10:
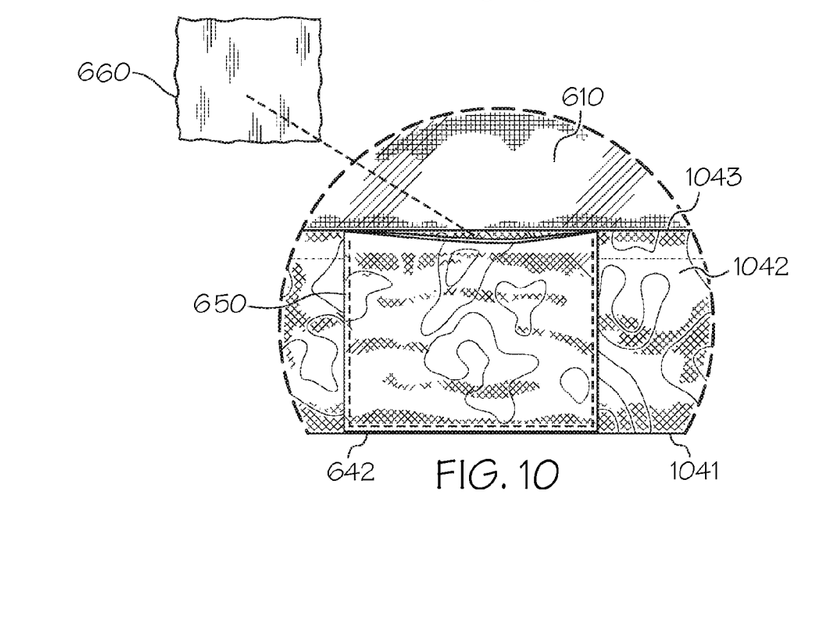
FIG. 10 is a detailed top plan view of a decorative edge of FIG. 7.

FIG. 10 is a detailed top plan view of a side of FIG. 7. A pattern 1042 is shown disposed along the two sides 642. The same pattern may be applied to the other cloth sides 620, 622, 640 or different patterns. In another example as also shown in FIG. 10, a pocket 650 may be formed in one or more of the cloth sides 620, 622, 640, 642 to hold catnip 660.

Examples of Cat Playing with Pet Toy

Figure 11:
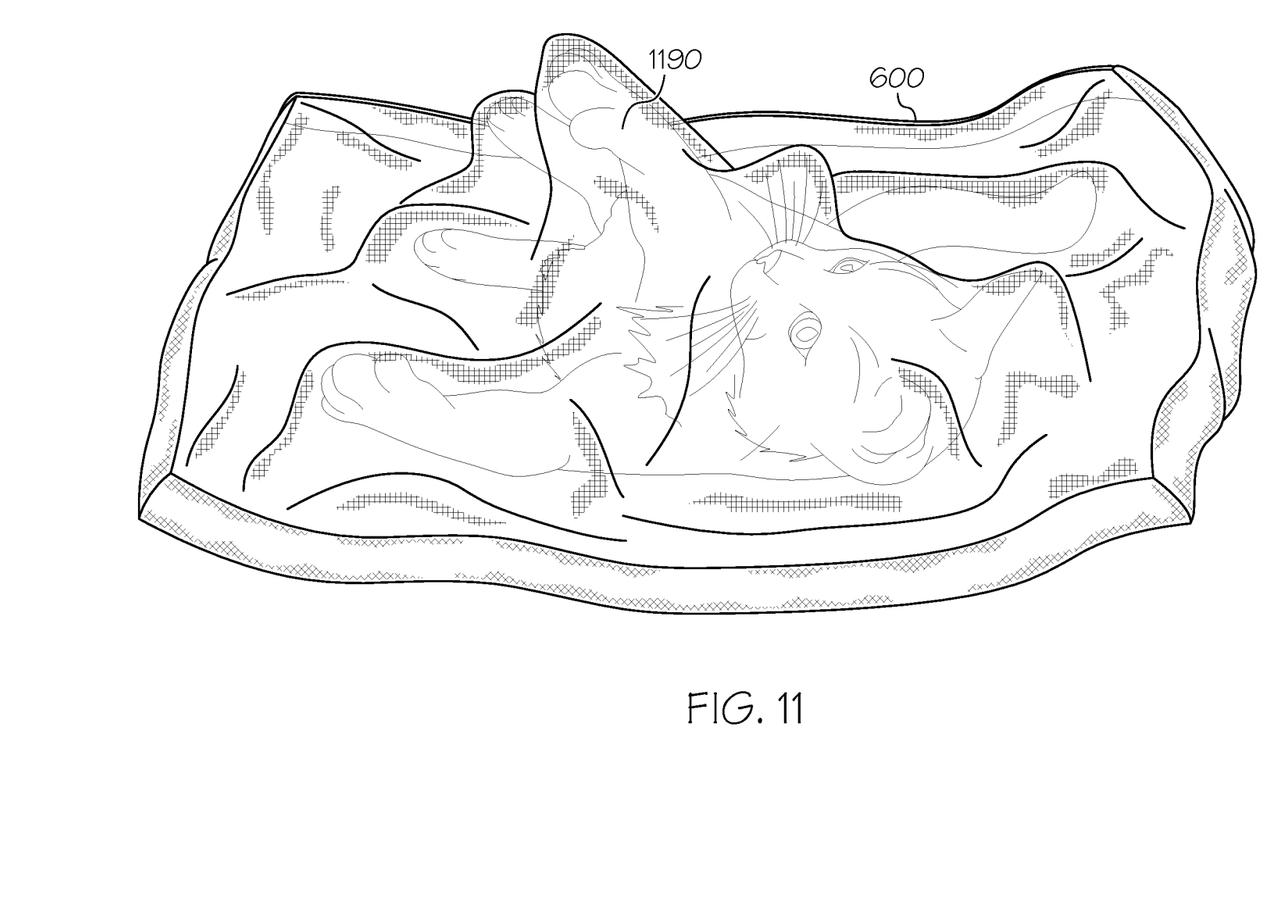
FIG. 11 is an example of a cat playing underneath the pet toy of FIG. 7.
Figure 12:
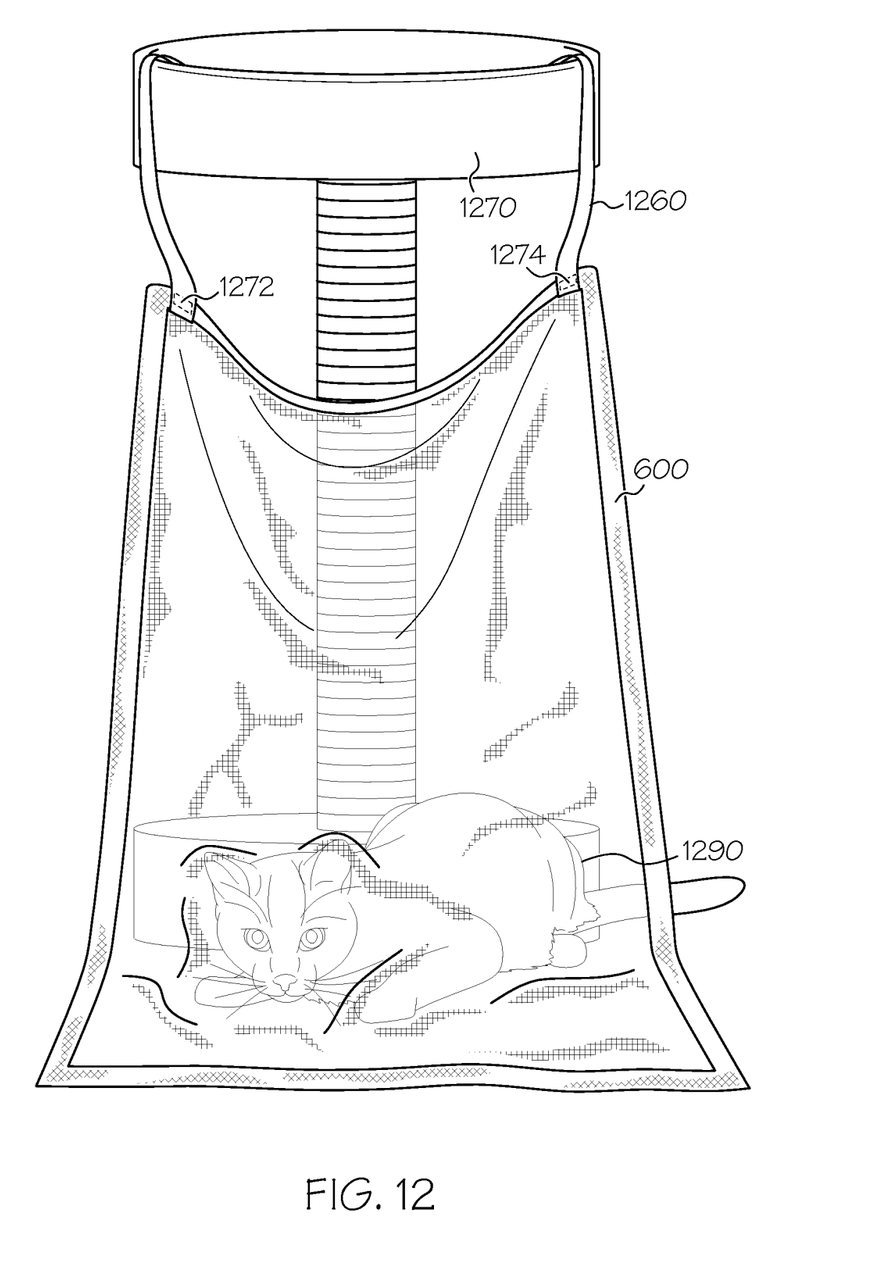
FIG. 12 is an example of a cat playing behind the pet toy of FIG. 7.

FIG. 11 is an example of a cat 1190 playing underneath the pet toy 600 of FIG. 7. The material is light enough and breathable so as not to harm the cat. Another example is shown in FIG. 12 a cat 1290 playing behind the pet toy 600 of FIG. 7. Detachable strap 1260 is shown releasably coupled to releasable fasteners 1272 and 1274. The releasable fasteners 1272 and 1274 in one example are hook and loop fastener such as Velcro® fasteners. In another example, the releasable fasteners are buttons, zippers, snaps, ties, or other equivalents. The detachable strap 1260 is used to fasten the pet toy 600 to furniture or other objects such as cat tower 1270. Note that the cat 1290 is in-between the cat tower 1270 and pet toy 600. The cat feels safe like it is hiding even though the center portion 610 is sheer.

In another example, the toy can be draped on furniture with a detachable strap or attached to a wall using Velcro® type fasteners or suction cups (not shown). Also the toy can be hung on a door with hooks (not shown). Also, tassels or pompoms may be added to the edge or side for extra fun and to provide additional weight. In yet still another example, as shown in FIG. 5, thin cellophane paper or other crinkle material 150 is sewn inside the edge or side, here in at least one exemplary cloth side 120, for weight and to make a crinkle sound to spark a cat's curiosity and to get the cat's attention. Waterproof and non-toxic crinkle material, such as those available from American Felt & Craft at online URL http://www.feltandcraft.com/crinkle-material-new-size/, is one example.

Third Example of Pet Toy

Figure 13:
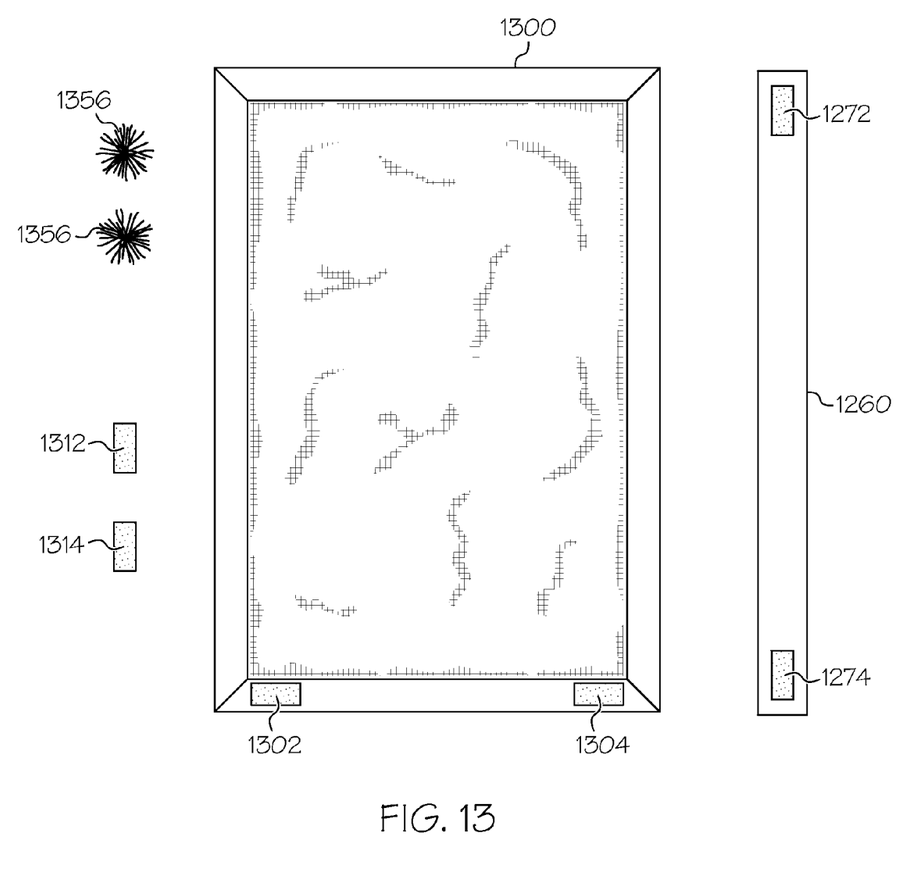
FIG. 13 is a cat toy set in a third example.
Figure 14:
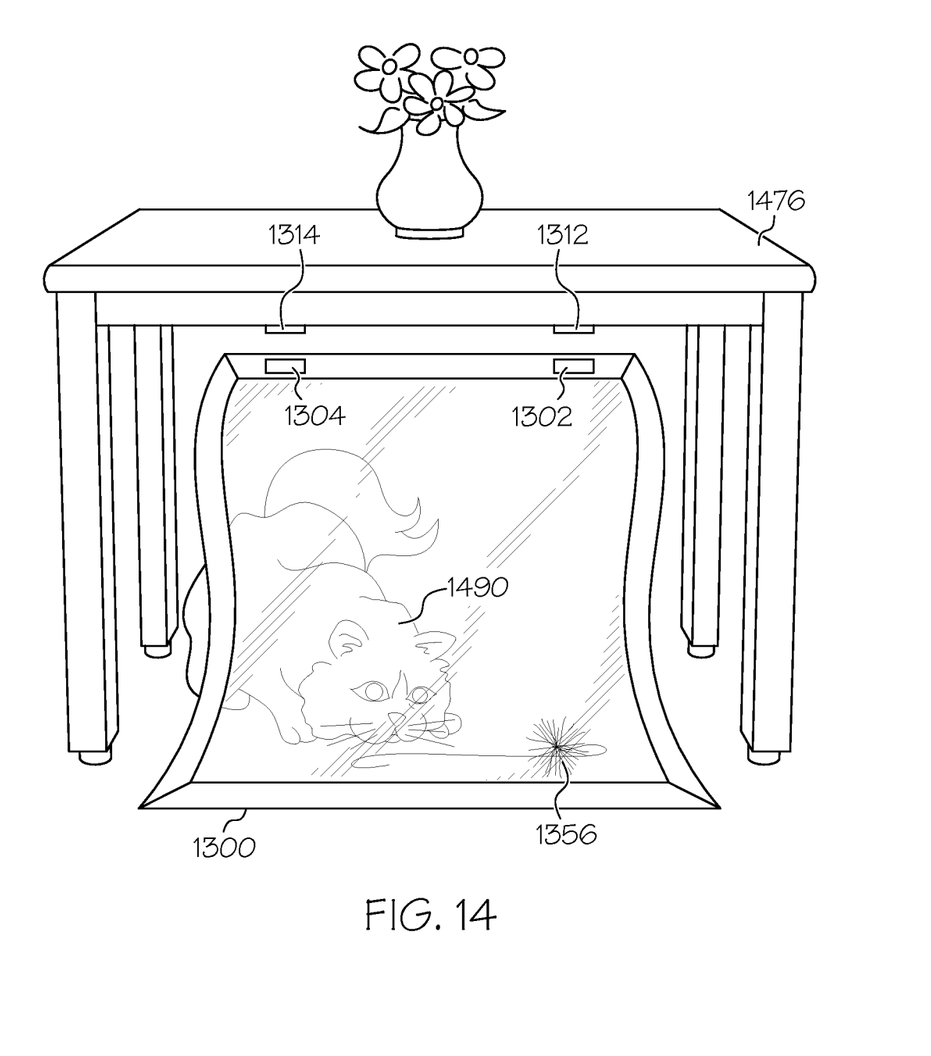
FIG. 14 is the pet toy of FIG. 13 attached to a table with a cat playing behind it.

Turning now to FIG. 13 and FIG. 14 of a pet toy set in a third example. FIG. 13 illustrates that pet toy 1300 with a detachable strap 1260. The detachable strap 1260 includes a set of Velcro® type fasteners 1272, 1274, to connect to compatible Velcro® type fasteners 1302, 1304 firmly attached to the pet toy 1300. Also shown are a set of Velcro® fasteners with adhesive backing 1312, 1314, such as 3M® Command™ strips. The set of Velcro® fasteners with adhesive backing can be used instead or in addition to the detachable strap 1260. An example use of Velco® fasteners 1312, 1314 is shown in FIG. 14. Also shown is a set of pet toys 1356 that can be used to play with the cat.

FIG. 14 is an example of a pet toy of FIG. 13 attached to a table with a cat 1490 playing behind the pet toy 1300. Shown are two sets 1302, 1312 and 1304, 1314 of Velcro® type fasteners attached to the underside of the table 1476. The two sets of fasteners holds one end of the pet toy 1300 to the table 1476 as shown. A cat 1300 is shown behind the toy looking at toy through a sheer center cloth portion. Again, although the sheer center portion and cloth edge are shown as substantially rectangular in shape, other geometric shapes are contemplated within the true scope and spirit of this invention.

Non-Limiting Examples

Although the invention is described herein with reference to specific examples, various modifications and changes can be made without departing from the scope of the present invention as set forth in the claims below.

What is claimed is:

1. A pet toy, comprising:
a geometrically-shaped sheer see-through center diaphanous cloth portion with at least one edge, the sheer see-through center diaphanous cloth acting as a hunting blind for a pet when positioned behind it;
at least one hemmed cloth side formed along the at least one edge;
a non-toxic crinkle material disposed inside the at least one hemmed cloth side; and
at least one of a hook and a loop releasable fastener portion disposed on an at least one edge.

2. The pet toy of claim 1, wherein the sheer see-through center diaphanous cloth portion is made from natural fiber, synthetic fiber, or a combination thereof.

3. The pet toy of claim 1, wherein the hemmed cloth side is formed from the sheer see-through center diaphanous cloth portion.

4. The pet toy of claim 1, wherein the hemmed cloth side is formed from a material that is different than the sheer see-through center diaphanous cloth portion.

5. The pet toy of claim 4, wherein the hemmed cloth side includes one or more patterns disposed thereon.

6. The pet toy of claim 4, further comprising:
at least one strap mechanically coupled to an at least one fastener portion.

7. The pet toy of claim 1, further comprising:
a pocket formed in one or more hemmed cloth side, the pocket formed to hold catnip.

8. The pet toy of claim 1, wherein the geometrically-shaped sheer see-through center diaphanous cloth portion is any one of circular-shaped, triangular-shaped, polygon-shaped, rectangular-shaped, or square-shaped.

9. A pet toy, comprising:
a geometrically-shaped sheer see-through center diaphanous cloth portion with at least one edge;
at least one hemmed cloth side formed along the at least one edge;
a pocket formed in one or more hemmed cloth side, the pocket formed to hold catnip;
at least a first portion of a releasable fastener disposed on an at least one edge; and
a detachable strap with a second portion of the releasable fastener disposed thereon to releasably attach to the first portion of the releasable fastener.

10. The pet toy of claim 9, further comprising:
at least a first portion of another releasable fastener disposed on an at least one edge; and wherein the detachable strap further includes at least a second portion of the another releasable fastener disposed thereon to releasably attach to the first portion of the another releasable fastener.

11. The pet toy of claim 9, wherein the hemmed cloth side is formed from a material that is different than the sheer center diaphanous cloth portion.

12. The pet toy of claim 9, wherein the hemmed cloth side includes one or more patterns disposed thereon.

13. A pet toy, comprising:
a rectangular shaped sheer see-through center diaphanous cloth portion with four edges, the sheer see-through center diaphanous cloth acting as a hunting blind for a pet when positioned behind it;
a hemmed cloth side formed along each of the four edges;
a non-toxic crinkle material disposed inside the hemmed cloth sides; and
a detachable strap with at least a first portion of a releasable fastener disposed thereon to releasably attach to a second portion of the releasable fastener attached to one of the four edges.

14. The pet toy of claim 13, wherein the first portion of the releasable fastener is one of a hook and loop fastener.

15. The pet toy of claim 13, wherein the hemmed cloth sides are formed from a material that is different than the sheer see-through center diaphanous cloth portion.

16. The pet toy of claim 13, wherein the hemmed cloth sides include one or more patterns disposed thereon.

17. The pet toy of claim 13, further comprising:
a pocket formed in the hemmed cloth side of one or more of the four edges, the pocket formed to hold catnip.

* * * * *